US009463748B2

(12) United States Patent
Presley

(10) Patent No.: US 9,463,748 B2
(45) Date of Patent: Oct. 11, 2016

(54) POWERED CARGO RACK FOR TALL VEHICLES

(71) Applicant: API ENGINEERING, LLC, Lafayette, CO (US)

(72) Inventor: Kenneth Lee Presley, Louisville, CO (US)

(73) Assignee: API Engineering, LLC, Lafayette, CO (US)

( * ) Notice: Subject to any disclaimer, the term of this patent is extended or adjusted under 35 U.S.C. 154(b) by 218 days.

(21) Appl. No.: 14/480,236

(22) Filed: Sep. 8, 2014

(65) Prior Publication Data

US 2015/0069101 A1    Mar. 12, 2015

Related U.S. Application Data

(60) Provisional application No. 61/875,527, filed on Sep. 9, 2013.

(51) Int. Cl.
*B60R 9/042* (2006.01)

(52) U.S. Cl.
CPC .................... *B60R 9/042* (2013.01)

(58) Field of Classification Search
CPC . B60R 9/042; B60R 9/0423; B60R 9/04236; B60R 9/055
USPC .......................................................... 224/310
See application file for complete search history.

(56) References Cited

U.S. PATENT DOCUMENTS

| | | | | |
|---|---|---|---|---|
| 3,531,006 A * | 9/1970 | Farchmin | ................. | B60R 9/042 414/462 |
| 3,720,334 A * | 3/1973 | Permut | ................... | B60R 9/042 414/462 |
| 4,245,947 A | 1/1981 | Clement | | |
| 4,260,314 A * | 4/1981 | Golze | ..................... | B60R 9/055 224/310 |
| 4,329,100 A * | 5/1982 | Golze | ..................... | B60R 9/055 177/136 |
| 4,339,223 A * | 7/1982 | Golze | ..................... | B60R 9/055 180/271 |
| 4,439,086 A * | 3/1984 | Thede | ....................... | B60R 9/08 224/310 |
| 4,826,387 A | 5/1989 | Audet | | |
| 5,346,355 A * | 9/1994 | Riemer | ................. | B60P 1/4435 224/310 |

(Continued)

FOREIGN PATENT DOCUMENTS

CA    2274331 A1 * 12/2000    ............. B60R 9/042

OTHER PUBLICATIONS

Hutchens et al. "Giraffe Rack Business Plan," *Giraffe Rack*. http://www.google.com/url?url=http://leeds-faculty.colorado.edu/moyes/html/documents/GiraffeRack.ppt&rct=j&frm=1&q=&esrc=s&sa=U&ei=k4qQVOTVVl4r-yQSqwoL4Cw&ved=0CCcQFjAH&usg=AFQjCNFGgF2PRNezARJEm1lSaiv0WUj5pg. [Accessed Sep. 1, 2013].

(Continued)

*Primary Examiner* — Corey Skurdal
(74) *Attorney, Agent, or Firm* — Lathrop & Gage LLP

(57) ABSTRACT

Provided are powered roof racks for tall vehicles, configured for cargo loading or unloading near to and parallel to the ground. The cargo is lifted to or lowered from roof height using an electric drive. Cargo motion comprises two separate essentially linear motions. The motion on and off of the roof is linear and essentially horizontal. The motion between roof height and the near ground level loading/unloading position is linear and near vertical. During all operations the load remains parallel to the ground. The majority of cargo load is supported on the ground during loading/unloading. All parts may be stored in a low profile roof mounted package when not in use, and ensures that setup and teardown uses a minimal number of easy to execute steps.

20 Claims, 12 Drawing Sheets

(56) References Cited

U.S. PATENT DOCUMENTS

| | | | |
|---|---|---|---|
| 5,360,150 | A | 11/1994 | Praz |
| 5,417,358 | A | 5/1995 | Haselgrove |
| 5,423,650 | A | 6/1995 | Zerbst et al. |
| 5,505,579 | A | 4/1996 | Ray et al. |
| 5,535,929 | A | 7/1996 | Neill |
| 5,544,796 | A | 8/1996 | Dubach |
| 5,586,856 | A | 12/1996 | Springer |
| 5,651,657 | A | 7/1997 | Poindexter |
| 5,673,831 | A | 10/1997 | Spratt |
| 5,782,391 | A | 7/1998 | Cretcher |
| 5,884,824 | A | 3/1999 | Spring, Jr. |
| 5,988,470 | A | 11/1999 | Siciliano |
| 6,015,074 | A | 1/2000 | Snavely et al. |
| 6,158,638 | A | 12/2000 | Szigeti |
| 6,357,643 | B1 | 3/2002 | Janner et al. |
| 6,427,888 | B1 | 8/2002 | Condon et al. |
| 6,428,263 | B1 | 8/2002 | Schellens |
| 6,561,396 | B2 | 5/2003 | Ketterhagen |
| 6,679,407 | B2 | 1/2004 | Weeks |
| 6,681,970 | B2 | 1/2004 | Byrnes |
| 6,712,247 | B1 | 3/2004 | Fox |
| 7,048,490 | B2 | 5/2006 | Henderson |
| 7,341,418 | B2 | 3/2008 | Ito |
| 7,476,071 | B2 | 1/2009 | Ito |
| 7,513,730 | B2 | 4/2009 | Goyanko |
| 8,322,580 | B1 * | 12/2012 | Hamilton ................ B60R 9/055 224/309 |
| 8,382,418 | B2 | 2/2013 | DiVerdi |
| 9,346,409 | B2 * | 5/2016 | Pfaeffli .................. B60R 9/045 |
| 2004/0173651 | A1 * | 9/2004 | Kim ........................ B60R 9/042 224/310 |
| 2006/0285954 | A1 * | 12/2006 | Neary .................... B60R 9/042 414/465 |
| 2007/0090139 | A1 * | 4/2007 | McKenzie .............. B60R 3/005 224/310 |

OTHER PUBLICATIONS

Giraffe Rack "Executive Summary," *Giraffe Rack*. http://careers.williams.edu/files/giraffe.pdf [Accessed Jun. 1, 2013].

\* cited by examiner

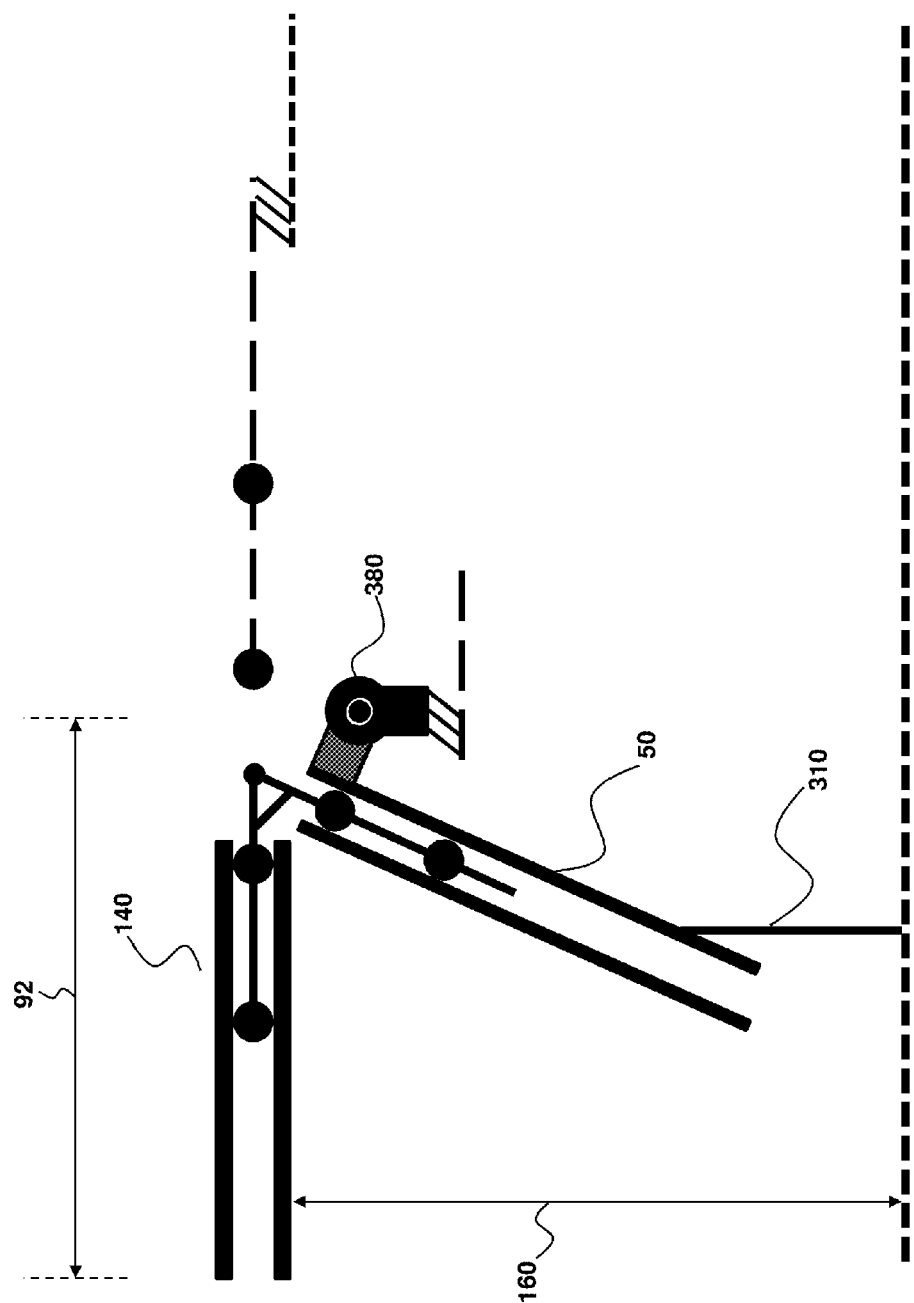

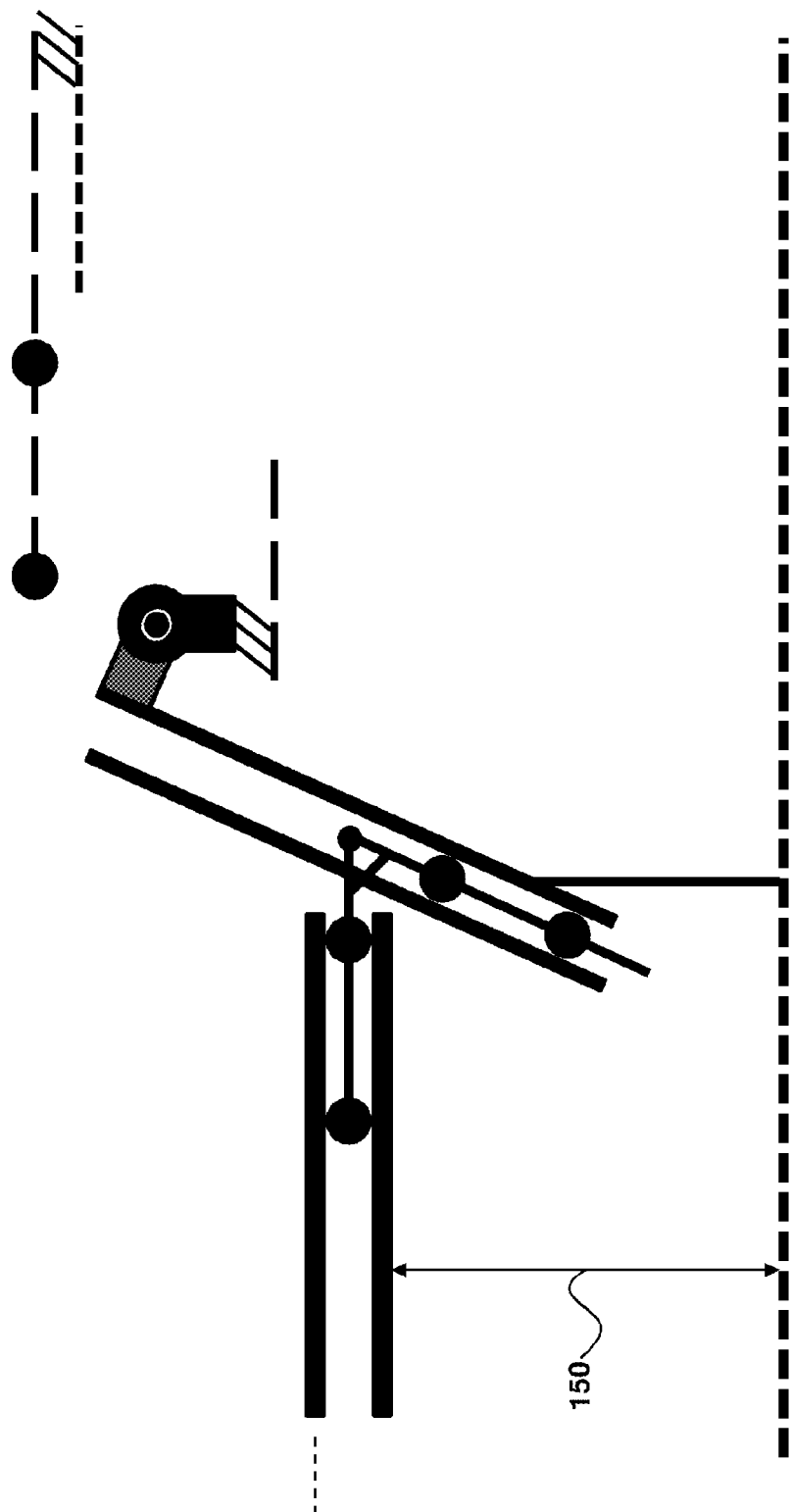

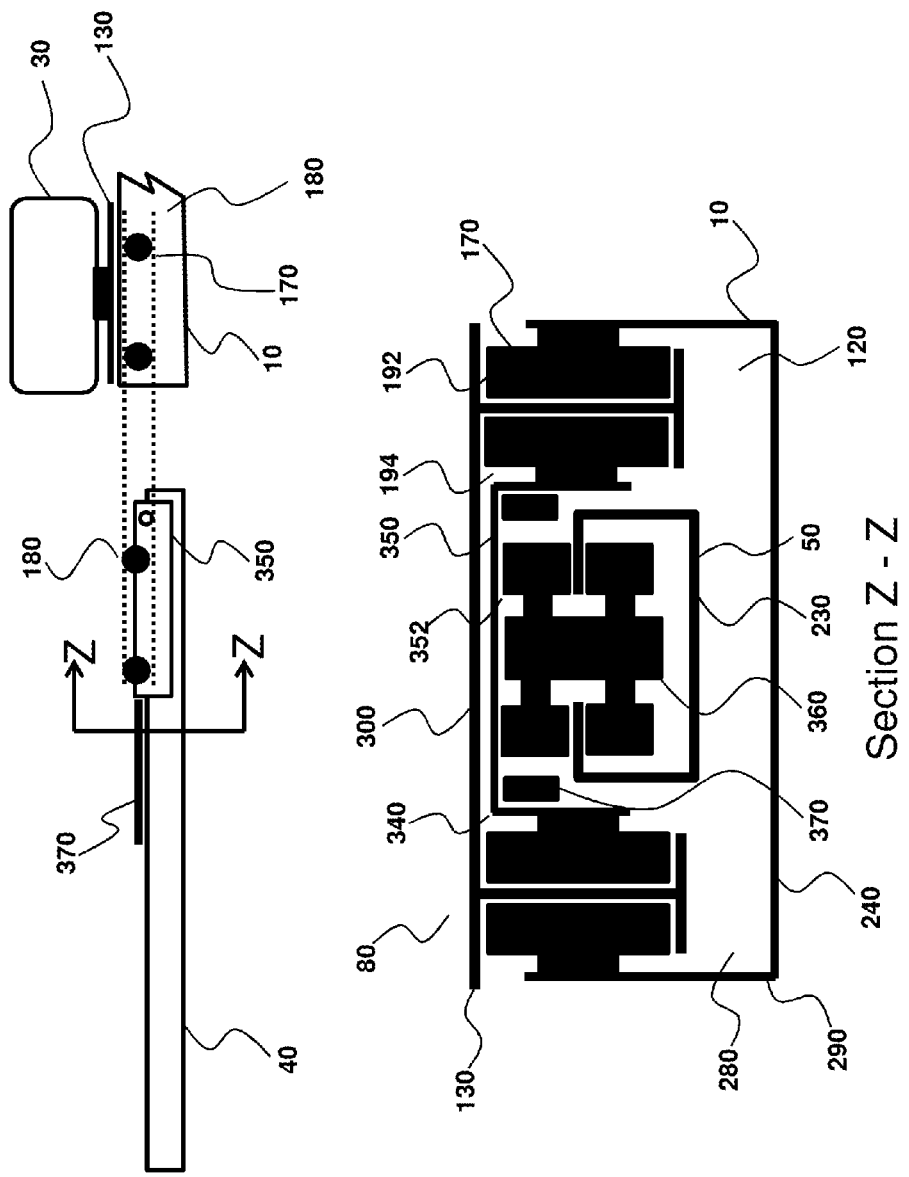

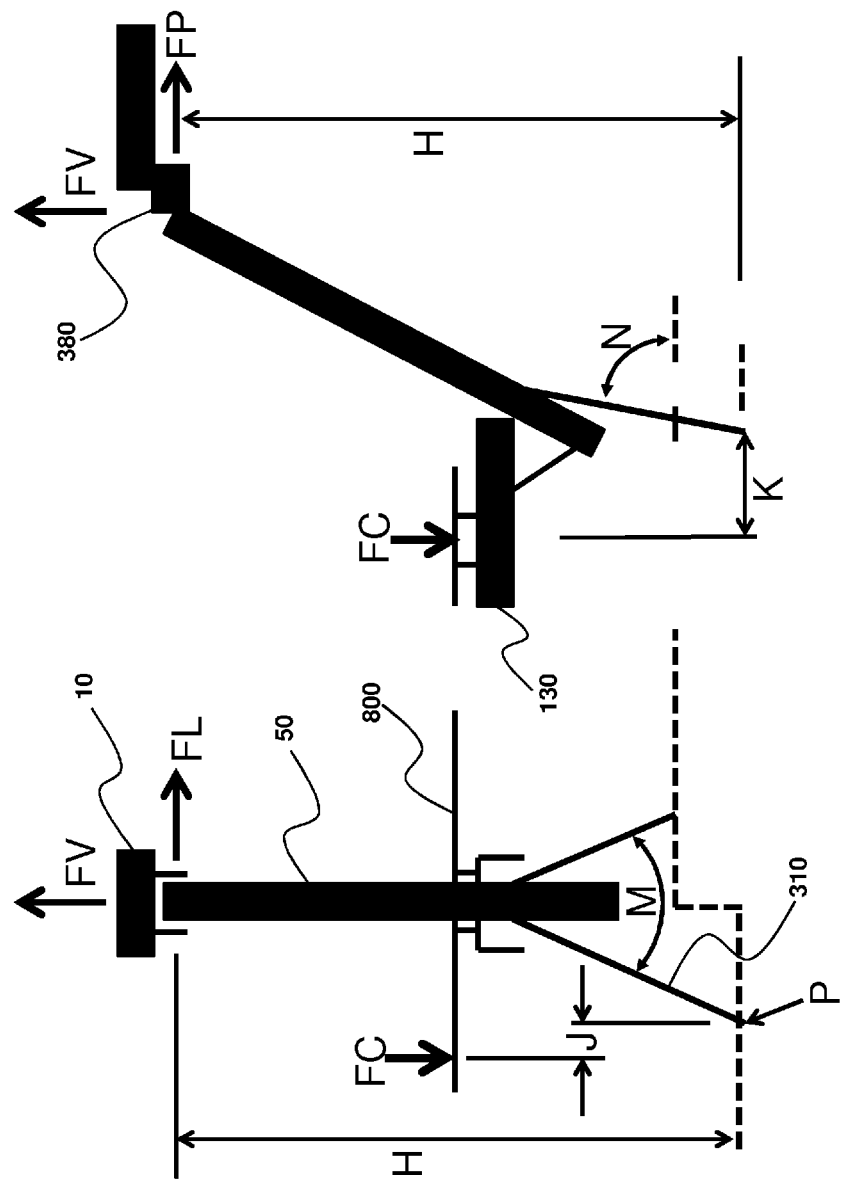

POWERED CARGO RACK FOR TALL VEHICLES

CROSS-REFERENCE TO RELATED APPLICATIONS

This application claims the benefit of priority from U.S. Provisional Patent Application No. 61/875,527 filed Sep. 9, 2013, which is hereby incorporated by reference in its entirety to the extent not inconsistent herewith.

BACKGROUND OF INVENTION

Provided herein are cargo racks for vehicle roofs and related methods, including for such racks that include mechanization for moving the rack between the roof and a position closer to ground level for easier loading and unloading.

Cargo racks designed to mount on vehicle roofs are widely available commercially. Such commercially available roof top racks, when placed on tall vehicles such as large sport utility vehicles, are difficult to load and unload due to their height above the ground. A wide range of patents attempt to make loading and unloading such racks easier. Many of those patents, e.g. U.S. Pat. Nos. 6,681,970, 6,015,074, involve various mechanizations based on pivoting the load from roof level to a lower level. U.S. Pat. No. 5,544,796, uses an alternate mechanization wherein the load travels along a track using a roller and track arrangement that keeps the car top load level to the ground through the range of motion. A preferred arrangement in the art is for two main tracks or beams which line up with two matching cross-members that mount to the vehicle roof.

Pivoting mechanizations, if they do not include power actuators, require the user to support the load overhead to a high degree during loading/unloading, inherently limiting the load to what an operator can handle. If they include actuators, the actuator torque required is large, resulting in large and expensive actuation systems. Many of the pivoting mechanizations do not maintain the load parallel to the ground making box type cargo carriers impractical to use. The tracked arrangement in U.S. Pat. No. 5,544,796 limits the need for the user to support the load, but requires a relatively fixed angle between the roof top rails and the side located rails, driving a difficult structural design for the rail to rail transition area. Racks having two parallel rails or beams are expected to be difficult to align for smooth operation free of binding and have the cost associated with two sets of hardware.

The shortcomings in the current racks known in the art are addressed herein.

SUMMARY OF THE INVENTION

Provided herein are devices and methods for supporting cargo on a vehicle roof specially configured for cargo loading to occur near to and parallel to the ground with the cargo then lifted to roof height where it is moved into position on the roof to be secured in place relative to the vehicle roof. In an aspect, an electric drive is used to translate cargo up relative to a vehicle side and onto the vehicle roof in a manner such that there is no unwanted physical contact with the vehicle.

During all operation and movement, the cargo load supported by the device remains parallel to the ground so that ease of loading/unloading is maximized. At roof height the cargo motion onto and off of the roof is essentially linear and essentially parallel to the ground. Cargo motion between roof height and the near ground level loading/unloading position is also essentially linear and near vertical. In this manner, the majority of the cargo load is supported on the ground during loading/unloading, thus ensuring vehicle loads are minimized. One particular advantage of the devices and methods provided herein is the ability for use of only one powered roof rack while accommodating cargo loads that are not centered on the roof rack. Furthermore, any of the devices and methods provided herein is configured so that all parts may be stowed within a low profile roof mounted package when not in use. Such configuration also results in a setup and teardown with a minimal number of easy to execute steps.

A central aspect of the roof racks provided herein is the special configuration of a roof beam mounted to a vehicle roof. Within the beam, is a deployable lift assembly that extends out of the roof beam and pivots relative to the roof beam to provide a longitudinal lift member that extends in a direction down toward ground level, but separated from a vehicle side or back surface. Specially configured translational connections facilitate cargo loading/unloading along two unique axes: a roof beam axis that is along an axis that is essentially parallel to the vehicle roof top and to the ground surface; and a longitudinal lift axis that is in a near vertical arrangement (e.g., less than 45° from absolute vertical). The longitudinal lift axis facilitates cargo loading/unloading at a convenient user-friendly height. The roof beam axis facilitates cargo load transfer to the vehicle roof. The combination and connections of the various device parts results in the important functional benefit of reliable and easy use, in an attractive, robust and compact form factor.

In an embodiment, the invention is a device for supporting cargo on a vehicle roof. The device may comprise a roof beam configured to connect to a vehicle roof and to support cargo on top of the vehicle roof. For example, the roof beam may connect directly or indirectly to a vehicle manufactured roof rack, such as a cross-bar, a side-bar, or a roof mount. A lift assembly is translationally and rotably connected to the roof beam, the lift assembly comprising: a longitudinal lift member and a foldable cargo slide support translationally connected to the longitudinal lift member. A unique aspect of the devices and methods provided herein are the ability to readily and easily deploy/store various component parts. For example, the lift assembly has a deployed configuration and a stored configuration, wherein in a deployed configuration the longitudinal lift member laterally extends from the roof beam and has a rotation angle relative to the roof beam to provide a deployed direction that extends in a direction from the vehicle roof toward ground level. The foldable cargo slide support when deployed extends from the longitudinal lift member and is aligned with the roof beam. In a stored configuration the lift assembly is stored within an interior volume of the roof beam. For example, the foldable cargo slide support may fold and align substantially parallel to the longitudinal lift member, which is then translated relative to the roof beam for storage within the roof beam interior volume. A cargo slide platform is translationally connected to the roof beam and to the foldable cargo slide support. The cargo slide platform translational connection with each of the roof beam and the foldable cargo slide support is releasable for translation of the cargo slide platform along the roof beam or the foldable cargo slide support. In this manner, the horizontal movement of the cargo slide platform occurs over at least a portion of the roof beam and, upon reaching an end of the roof beam, then is over at least a portion of the cargo slide platform.

The cargo slide platform and foldable cargo slide support in combination translate along the longitudinal lift member from a minimum height for cargo loading or unloading to a transfer height that aligns the cargo slide platform with the roof beam. In this aspect, "transfer height" refers to device positioning so that the cargo slide platform is capable of transitioning from the roof beam to the foldable cargo slide support, or vice versa. The cargo slide platform is continuously horizontally aligned during translation along the longitudinal lift member and translation along the roof beam.

There are many possible translational connections that may be used with the devices and methods provided herein to provide the desired movements. For example, a pair of translating components may have a desired frictional coefficient such that sliding under an applied force reliably occurs. Alternatively, a ratchet-based connector may facilitate translational movement.

In one embodiment, the translational motion is facilitated by interaction of rollers on a first component that operably engage a track on a second device component. In this embodiment, the cargo slide platform translational connections comprise: a plurality of roof beam rollers connected to the roof beam; a plurality of foldable cargo slide support rollers connected to the foldable cargo slide support; a two-faced track connected to the cargo slide platform having a first track and a second track to receive: the roof beam rollers in the first track for translation of the cargo slide platform relative to the roof beam to provide motion in a horizontal direction toward or away from a vehicle centerline; and the foldable cargo slide support rollers in the second track for translation of the cargo slide platform relative to the foldable cargo slide support to provide motion in a horizontal direction toward or away from the roof beam.

In an aspect, the translational connection between the foldable cargo slide support and the longitudinal lift member comprises a plurality of second foldable cargo slide support rollers connected to the foldable cargo slide support; and a longitudinal track connected to the longitudinal lift member for operably receiving the plurality of second foldable cargo slide support rollers.

In an aspect, at least a portion of a lift assembly surface is configured to slide over at least a portion of a roof beam surface in a direction aligned with a longitudinal axis of said roof beam under a user-applied force. Alternatively, a plurality of rollers operably engaged with a track may facilitate the translational motion of the lift assembly relative to the roof beam, and any other components stored therein.

The devices provided herein are versatile, and compatible with cargo loading from a left, right, or rear side of a vehicle; or use with a plurality of cargo slide platforms for cargo loading from a left and a right side of a vehicle with a single roof beam.

In an aspect, the minimum height for cargo loading or unloading is greater than or equal to two feet and less than or equal to 6 feet; the transfer height is greater than the minimum height and corresponds to a vertical height from the ground of said roof beam on a vehicle roof. For example, typical "tall" vehicle heights for consumer cars, vans and trucks may range from between about 5 feet and 7 feet, or even higher such as for commercial vans and trucks, such as up to about 10 feet. Accordingly, transfer heights may correspond thereto, plus an additional height corresponding to the distance of the roof beam from the vehicle roof. The cargo slide platform has a horizontal range of motion relative to the roof beam and the foldable cargo slide support selected to avoid physical contact between any of said lift assembly or cargo slide platform with a vehicle surface. This type of horizontal range of motion may correspond to the linear distance traversed along the roof beam (from a cargo slide platform stored position wherein a portion is within the roof beam interior volume) and the linear distance along the foldable cargo slide support. In an aspect, this horizontal distance may be greater than about 2 feet and less than about 6 feet.

Another horizontal motion may be described in terms of the vertical offset between ends of the longitudinal lift member, and is readily calculated from the length of the longitudinal lift member (L) and the angle relative to the ground ($\theta$): $L \cos \theta$, where L may range from about 1 foot to 8 feet, and $\theta$ between 45° and 90°. This aspect relates to non-vertical lift longitudinal members so that a cargo slide platform and foldable cargo slide support that together translate along the non-vertical lift longitudinal member have a motion described in two dimensions, with both a vertical and a horizontal travel.

In an aspect, the longitudinal lift member deployed direction has an angle relative to a ground surface that is greater than 45° and less than or equal to vertical (90° and the deployed longitudinal lift member does not contact a vehicle surface.

Any of the devices provided herein may further comprise a mount connected to the roof beam for connecting the roof beam to a commercially available vehicle roof rack, or more generally the vehicle roof.

The devices provided herein have a roof beam interior volume and cross-sectional shape configured to receive the lift assembly and cargo slide platform during device storage. In an aspect, the U-shaped cross-section provides a roof beam open top surface that is occupied by the cargo slide platform having a top surface that then defines an interior volume top surface during device storage. The cargo slide platform top surface may have a sufficiently tight connection to provide a substantially waterproof roof beam interior volume during device storage. In an aspect, only a portion of the cargo slide platform may reside within the roof beam interior volume, as the top surface may actually be positioned over the top of the side walls of the U-shaped roof beam. Irrespective of the specific relative location of the cargo slide platform top surface, the devices provided herein advantageously provide compact storage between the various elements to thereby provide a compact and low profile stored device, such as when not in use, with a maximum roof beam height less than about 6". In an aspect, the stored device may be described as having a stored volume, such as a stored volume that is less than or equal to 5 foot$^3$, or between about 2.5 ft$^3$ and 4 ft$^3$. Similarly, the cross-sectional area from a front view of the major longitudinal roof beam axis can be less than or equal to 72"×6". The cross-sectional area from a side view of the roof beam axis can be less than or equal to 6"×16".

In an embodiment, the lift assembly further comprises one or more ground support legs operably connected to a lower end of the longitudinal lift member. During a longitudinal lift member deployed configuration the one or more ground support legs contact a ground surface at an angle to stably support the longitudinal lift member during cargo loading or unloading. The one or more ground support legs may have an independently adjustable length. In an aspect, there are two ground support legs that extend from either side of the longitudinal lift member to provide stability in multiple directions. In an aspect, the ground support legs are rotably connected to provide a ground support leg deployed and stored position. The ground support legs may then be further stored within the roof beam during lift assembly stored position.

For aspects where the device is electrically powered, the device further comprises an electric drive connected to the lift assembly to translationally move the foldable cargo slide support along the longitudinal lift member. In this manner, cargo is moved up and down a vertical height between the loading/unloading height and transfer height. The translational connection of the cargo slide platform facilitates a relatively minor user-supplied force to move the cargo toward the roof top for cargo loading. A similar configuration in reverse facilitates cargo unloading from a vehicle roof.

The electric drive may be positioned within an interior volume of the longitudinal lift beam during device storage. Alternatively, the electric drive may be connected to the longitudinal lift member, but in such a configuration as to ensure the electric drive may be positioned within the roof beam interior volume during device storage.

Any of the roof beams described herein may have a substantially U-shaped cross-section with an open upper facing surface that defines an internal volume and the cargo slide platform has a top surface for supporting cargo; wherein in a device stored position the cargo slide platform top surface extends across the roof beam open upper facing surface to define a roof beam closed volume in which the lift assembly is positioned. The roof beam cross-sectional dimensions are selected so as to provide the capability to store other elements of the device. In an aspect, the roof beam height is between about 3" and 6", such as between about 3.5" and 4.5", or about 4". In an aspect, the roof beam width is between about 6" and 16", such as between about 4" and 16", or about 14". In an aspect, the roof beam length is slightly longer than a vehicle width, so long as the mounted device is within legal width limits. In an aspect, the roof beam length is about the width of the vehicle roof, or at least 10% or about at least 20% shorter than the width of the vehicle roof.

Any of the devices may further comprise one or more ground support legs rotably connected to the longitudinal lift member and configured to rotate to a stored position substantially parallel with a longitudinal axis of said longitudinal lift member for storage within said roof beam closed volume. In this aspect, "substantially" refers to within about 10°, or within about 5° of true parallel. The stored ground support legs may be parallel to and in physical contact with a longitudinal lift member surface.

The devices provided herein may further comprise: a plurality of roof beam rollers connected to the roof beam; a plurality of foldable cargo slide support rollers connected to the foldable cargo slide support; and a two-faced track connected to the cargo slide platform having a first track and second track. The first track can receive the roof beam rollers for translation of the cargo slide platform relative to the roof beam to provide motion in a horizontal direction toward or away from a vehicle centerline. The second track may receive foldable cargo slide support rollers for translation of the cargo slide platform relative to the foldable cargo slide support to provide motion in a horizontal direction toward or away from the roof beam. In a device-stored position the two-faced track is positioned within the roof beam internal volume and supported on the plurality of roof beam rollers positioned in the first track. The lift assembly positioned fully in the roof beam internal volume with the foldable cargo slide support folded into a stored position positions the plurality of foldable cargo slide rollers in alignment with the second track for translation of the lift assembly along the roof beam and the cargo slide platform and into the roof beam internal volume.

In an aspect, the foldable cargo slide support comprises: a cargo slide support beam for translationally receiving the cargo slide support platform; a powered lift slide that translationally moves along the longitudinal lift member and is connected to said cargo slide support beam; an electric drive operably connected to the powered lift slide that provides power to translate the powered lift slide relative to the longitudinal lift member; an adjustable length strut connected to the cargo slide support beam to establish and maintain said horizontal alignment of the cargo slide support platform during translational motion along the longitudinal lift member.

The device may further comprise a plurality of lift slide rollers connected to the powered lift slide to transmit moments in three orthogonal axes during translational motion along said longitudinal lift member.

In an embodiment, the device further comprises a cargo frame connected to a top surface of the cargo slide platform, wherein the cargo frame supports one or more of a bicycle, a kayak, a canoe, a container, a ski, a snowboard and/or a ladder. An advantage of the system provided herein is the ability to connect any type of cargo frame to the top surface of the cargo slide platform, depending on the cargo to be carried. In this manner, there is a core device portion that may be unchanged, with a swapping out of the cargo frame depending on cargo type.

In another embodiment, provided herein are methods for loading or unloading cargo on or from a vehicle roof comprising use of any of the devices provided herein.

In an aspect, the invention is a method for storing cargo on a vehicle roof comprising the steps of: removing a lift assembly comprising a longitudinal lift member from an interior volume of a roof beam that is connected to the vehicle roof; pivoting the removed lift assembly relative to the roof beam to extend the longitudinal lift member in a direction away from the vehicle roof and toward a ground surface; deploying one or more ground support legs connected to an end of the longitudinal lift member to support the removed lift assembly against the ground surface; aligning a foldable cargo slide support connected to the longitudinal lift member with the roof beam at a transfer height; removing a cargo slide platform from the roof beam by translating the cargo slide platform along the roof beam and translating along the foldable cargo slide support; translating the cargo slide platform and the foldable cargo slide support along the longitudinal lift member to a cargo loading height that is less than the transfer height; securing cargo to the cargo slide platform at the cargo loading height; translating the cargo slide platform and the foldable cargo slide support along the longitudinal lift member to the transfer height, thereby aligning the cargo slide platform and cargo with the roof beam; moving the cargo slide platform and cargo from the foldable cargo slide support to the roof beam by translating the cargo slide platform along the foldable cargo slide support and the roof beam; securing the cargo on the cargo slide platform to the vehicle roof; and storing the one or more ground support legs, the lift assembly, and the foldable cargo slide support within the roof beam interior volume; wherein during translation of the cargo slide platform, the cargo slide platform is continuously maintained in a substantially horizontal configuration.

In an aspect, provided herein is a device for practicing any methods described herein.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIGS. 2A-2D illustrate: A translational motion of the cargo slide platform from fully on the roof beam. B transition from the roof beam to the cargo slide support platform; C fully on the cargo slide support platform; and D translation that includes a vertical direction to a loading height ready for receipt of cargo. The steps are reversed to move cargo to the vehicle roof.

FIG. 4. Stored configuration within a roof beam. The bottom panel is a cross-sectional view along section line ZZ as indicated in the top panel.

FIG. 5A shows offset loads configuration for the front view. FIG. 5B shows offset loads configuration for the side view.

DETAILED DESCRIPTION OF THE INVENTION

Figure 1A:
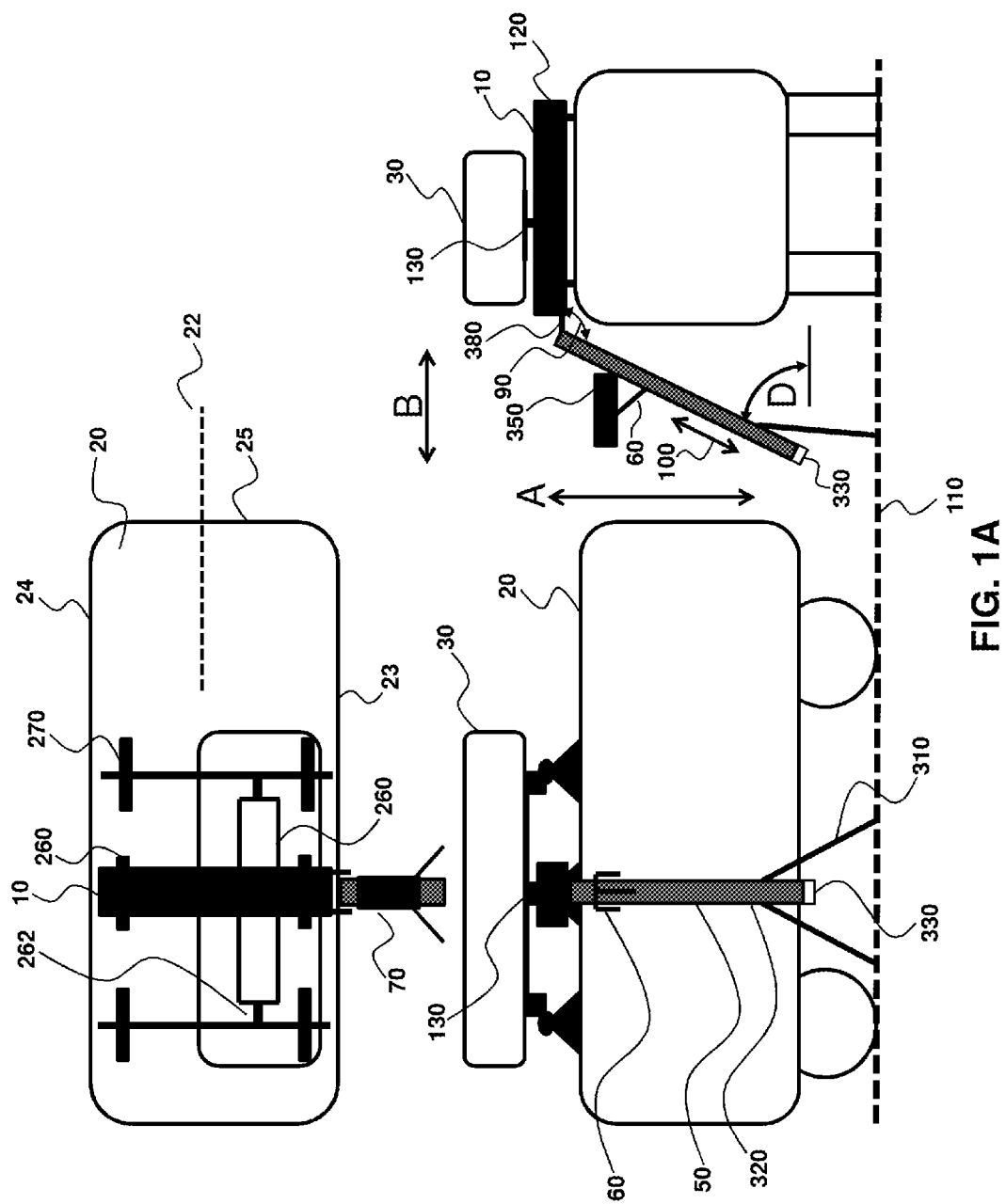
FIG. 1A is a schematic illustration of a fully deployed device connected to a vehicle and ready to receive cargo. The top left panel is a top view. The bottom left panel a side view. The bottom right panel an end view.

In general, the terms and phrases used herein have their art-recognized meaning, which can be found by reference to standard texts, journal references and contexts known to those skilled in the art. The following definitions are provided to clarify their specific use in the context of the invention.

"Operably connected" or "operably receiving" refers to a configuration of elements, wherein an action or reaction of one element affects another element, but in a manner that preserves each element's functionality. For example, a track may operably receive corresponding rollers such that the rollers rotation provides translation motion between an element connected to the rollers and the track. Ground support legs operably connected to a longitudinal lift member refers to the ground support that may provide load distribution to the ground without impacting the ability of the longitudinal lift member to translate the foldable cargo slide support. Similarly, the action of an electrical drive to move the powered lift slide without adversely impacting the function of the lift slide portion or other elements connected thereto is considered "operably connected."

"Translationally connected" refers to a configuration of elements, wherein motion of one element is substantially unidirectional and parallel with respect to another element, wherein movement of one element does not affect each element's functionality. Similarly, "rotably connected" refers to a configuration of elements, wherein motion of one element is substantially rotational with respect to another element, wherein rotation of one element does not affect each element's functionality.

"Deployed" refers to the movement of at least one element so that the device is ready for use. "Stored" refers to the ability to compactly position an element with respect to another element, such as for when the device is not actively in use for cargo loading/unloading.

"U-shaped" refers to a roof beam having a bottom facing surface that generally faces the vehicle roof, and two sides that connected to the bottom facing surface at and edge and extend up in a direction away from the vehicle roof. There is an opening defined between the edges which may receive the cargo slide platform. The space within the bottom and edge surfaces is referred herein as a roof beam "interior volume" and is useful for storage of the other elements of the device. The corners of the U-shape may have sharp corners, may have curved corners, or may have multiple straight edges. The invention provided herein is compatible with any number and kinds of shapes, so long as the device storage functionality is maintained. For example, the two sides need not be vertical, but can be angled and/or curved. In an aspect, the sides may be streamlined so as to minimize drag.

"Electric drive" refers to a motor and drive train assembly useful for moving a foldable cargo slide support and specific elements thereof, up and down a deployed longitudinal lift member. The device and cargo load movement are configured such that a motor having a power output of less than about 100 watts is capable of moving a cargo load of up to about 200 pounds along the longitudinal lift member between the loading/unloading height and the transfer height, such as a vertical travel of about 40 inches in a time of about 30 seconds. An important aspect of the devices provided herein is that a gearbox output torque less than the order of ten's of inch-lbs is sufficient for operation. In contrast, conventional roof racks with pivot designs require on the order of 100's of foot-lbs.

Unless defined otherwise herein, "substantially" refers to a value that is within 20%, within 10%, or within 5% of a true value.

In the stowed or stored position, roof top cargo is mounted to the cargo frame that is supported on the cargo slide platform. The cargo slide platform is supported on rollers and locked in place on the roof beam. The length of the roof beam is approximately the same as the width of the vehicle. The roof beam may attach to the roof via commercially available car top cross members or other commercially available car top mount hardware. The cargo frame is further secured by cargo locks, located at one or both ends and which attach to commercially available car top cross members. All cargo locks are accessible from the side of the vehicle. In the stowed position the lift assembly is in a folded configuration and is stowed fully inside the roof beam assembly. The lift assembly length is slightly less than the roof beam assembly.

For use, the operator removes the lift assembly from inside the roof beam assembly and may be placed on pivot points located on the roof beam assembly. It is then pivoted down by the operator to a point where the pivots fully support the lift assembly at a preset angle via angle control features within the pivots. In this location ground support legs are folded out by the operator and located to support the lift assembly on the ground at the angle established by the angle control features in the pivots. The ground support legs are independently adjustable that allow their lengths to be independently adjusted to accommodate uneven ground and also to accommodate different height vehicles.

The lift assembly includes a cargo slide support beam with cargo support rollers that is mounted to a powered lift slide. In the stowed position the cargo slide support beam is folded down parallel to the main beam of the lift assembly. After the lift assembly is supported on the ground the operator folds the cargo slide support beam out and locks it in place with an adjustable length strut. The strut is preset to a length such that the cargo slide support beam will be essentially parallel to the cargo slide platform on the roof beam assembly. At this point the electric drive is used to position the cargo slide support beam on the lift assembly so that its cargo support rollers are located at the same level as the tracks on the cargo slide platform in its position on the roof beam assembly.

To unload the cargo the operator releases the cargo locks and rolls the cargo supported on the cargo slide platform from where it is supported on the roof beam assembly to where it is supported on the lift assembly by the foldable cargo slide support. The direction of this motion is linear and essentially horizontal and perpendicular to the side of the vehicle for the side-loading configuration or to the rear of the vehicle for rear-loading. After the cargo is in position on the cargo slide support platform the operator secures the cargo slide support platform in position on the lift assembly. During cargo loading the operator simply reverses these operations.

In the lift assembly the powered lift slide is supported on an electric driven linear motion mechanism, such as a chain drive or ball screw that prevents motion except when powered. In an embodiment a chain drive is used for its tolerance of environmental contamination. In an embodiment, a ball screw drive is used for its quiet operation and high efficiency. Once the cargo is supported on the lift assembly the operator actuates the powered lift slide to lower the cargo from roof height (e.g., transfer height) to the desired lower position (e.g., cargo loading/unloading height). For typical tall vehicles the lift assembly length will result in the powered lift slide in its lowest position being near waist height, which may vary between users of different heights, but that typically is about 3 feet. In an aspect, a convenient loading/unloading position may have a height selected from a range of about 2 to 4 feet, a position that enables easy loading and unloading of cargo. Loading is simply a reversal of these operations.

In an embodiment, a single powered roof rack is used. The invention includes features that allow the cargo center of gravity to be offset from the center of the powered roof rack. This embodiment has the advantage of minimizing system cost, minimizing setup alignment requirements, and minimizing operator setup time and effort. The invention, however, remains compatible with use of a second powered roof rack for higher load capacity.

Figure 1B:
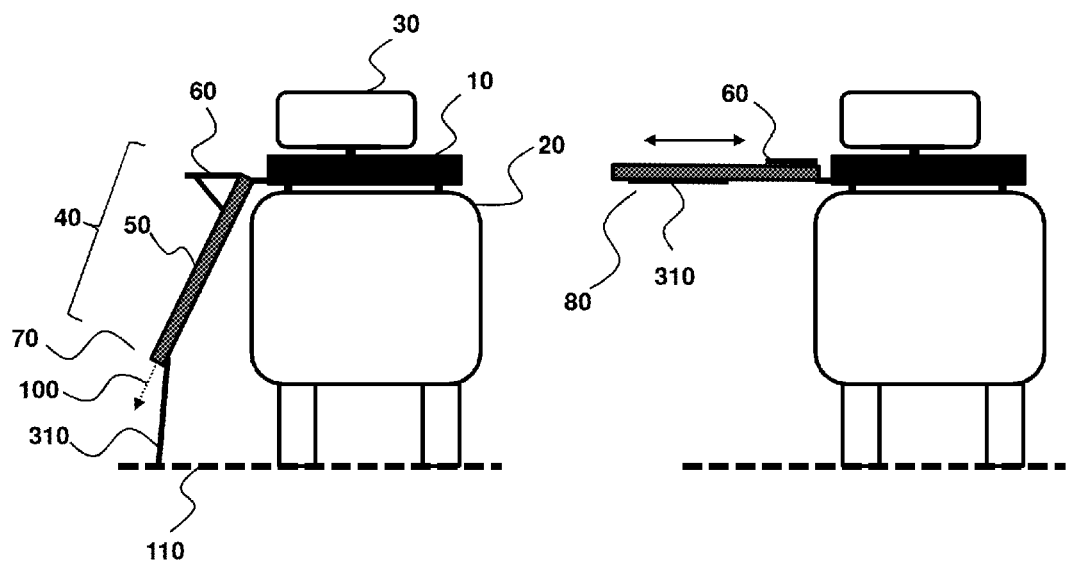
FIG. 1B is a rear view showing the fully deployed device (left panel) and a partially stored device (right panel) with the foldable cargo slide and ground support leg stored against the longitudinal lift member with a linear direction of motion as indicated by the arrows.
Figure 1C:
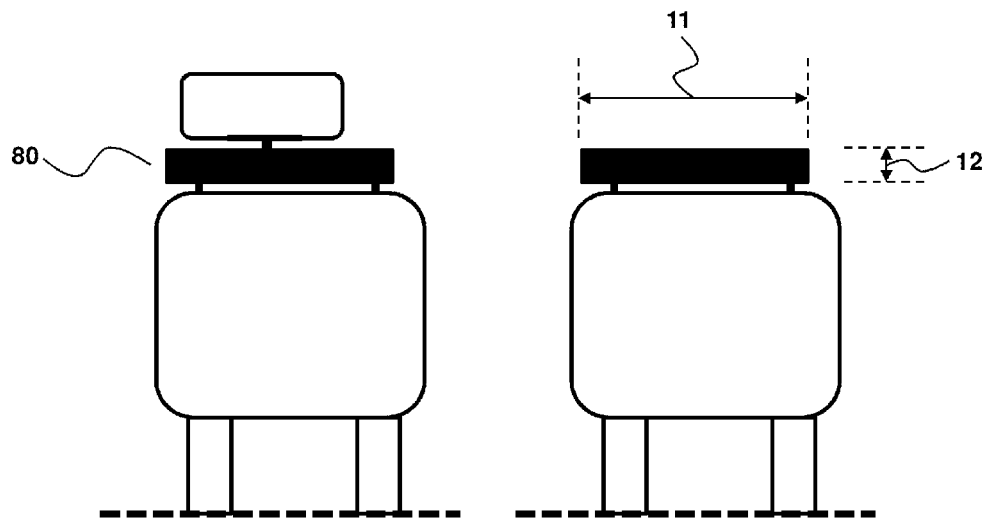
FIG. 1C illustrates a fully stored device with a cargo load (left panel) and without any cargo load (right panel).
Figure 7:
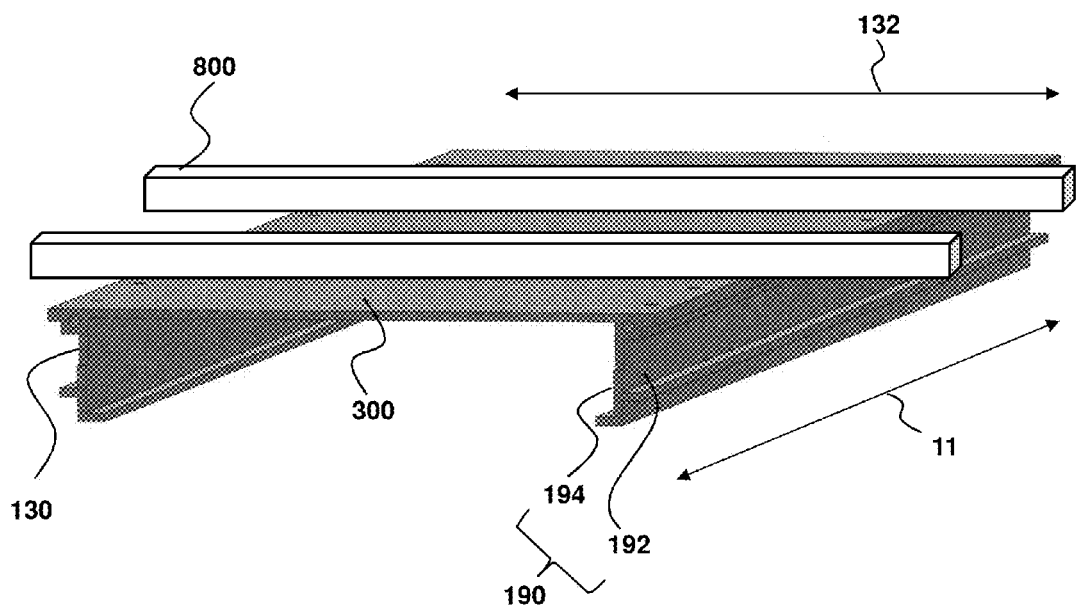
FIG. 7. Cargo slide platform and cargo frame connected thereto.

FIG. 1 is a schematic illustration of one embodiment of the device connected to a vehicle. Referring to FIG. 1A-1C, a roof beam 10 connects to a vehicle roof 20 and supports cargo 30. A lift assembly 40 is translationally and rotationally connected to the roof beam 10. In this example, the lift assembly 40 comprises a longitudinal lift member 50 and a foldable cargo slide support 60. As shown in FIGS. 1B-1C, lift assembly 40 may be stored in roof beam 10 so that the lift assembly has a deployed configuration 70 and a stored configuration 80. Roof beam may have a length 11 and a height 12, and a depth that is defined by the length 132 of the cargo slide platform 130 (see FIG. 7). Longitudinal lift member has a rotation angle 90 relative to the roof beam, such as provided by pivot point 380, laterally extends from the roof beam as indicated by arrow B, and has a deployed direction 100 that extends from the roof toward ground level 110 (see FIG. 1B, right panel). Roof beam 10 has an interior volume 120 that can receive the other device elements in a stored configuration. Cargo slide platform 130 (see also FIGS. 2A-2D and FIG. 7) is translationally connected to the roof beam 10 and the foldable cargo slide support 60. In combination, foldable cargo slide support 60 and cargo slide platform 130 together translate along longitudinal lift member 50 along a direction 100, ranging from a minimum (loading) height 150 (see FIG. 2D) for cargo loading/unloading to a transfer height 160 (see FIG. 2C) where the foldable cargo slide support 60 and cargo slide platform 130 are aligned with respect to roof beam 10. To facilitate cargo support, a cargo frame 800 may be connected to top surface 300 as illustrated in FIG. 7 The cargo frame may be any type of frame used to secure a cargo, such as part of a bike holder to hold bikes, ladder holder to hold a ladder, ski/board rack to hold skis or boards. In this manner, the only portion of the devices provided herein that change with cargo type is the cargo frame 800. This aspect is referred herein as "customized" to support a cargo and reflects that the parts of the rack described herein may be used to support any number and types of cargo frames. Accordingly, the platform top surface may be universal, with different mounts or connections to secure different types of cargo frames.

Figure 2A:
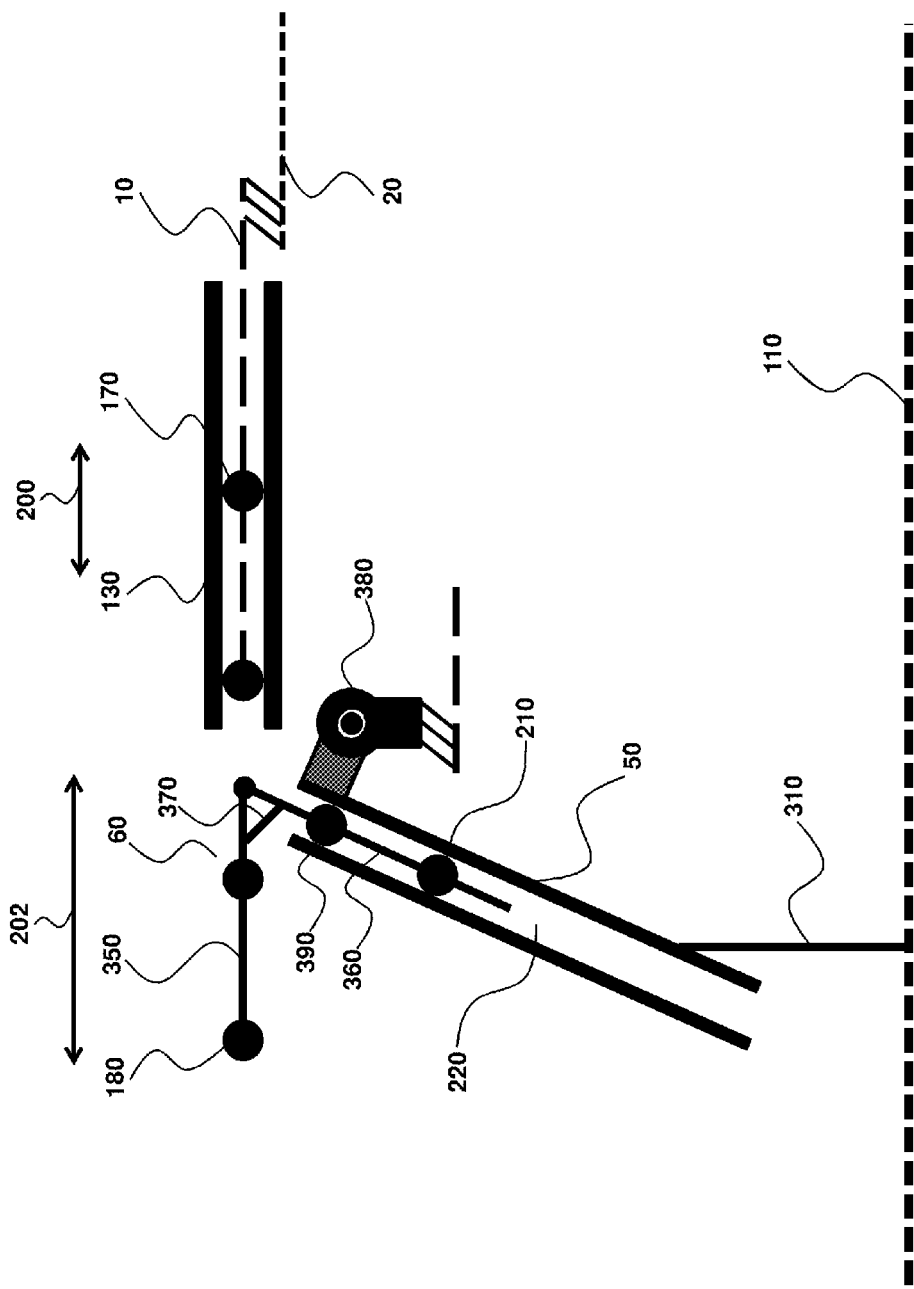
Figure 2B:
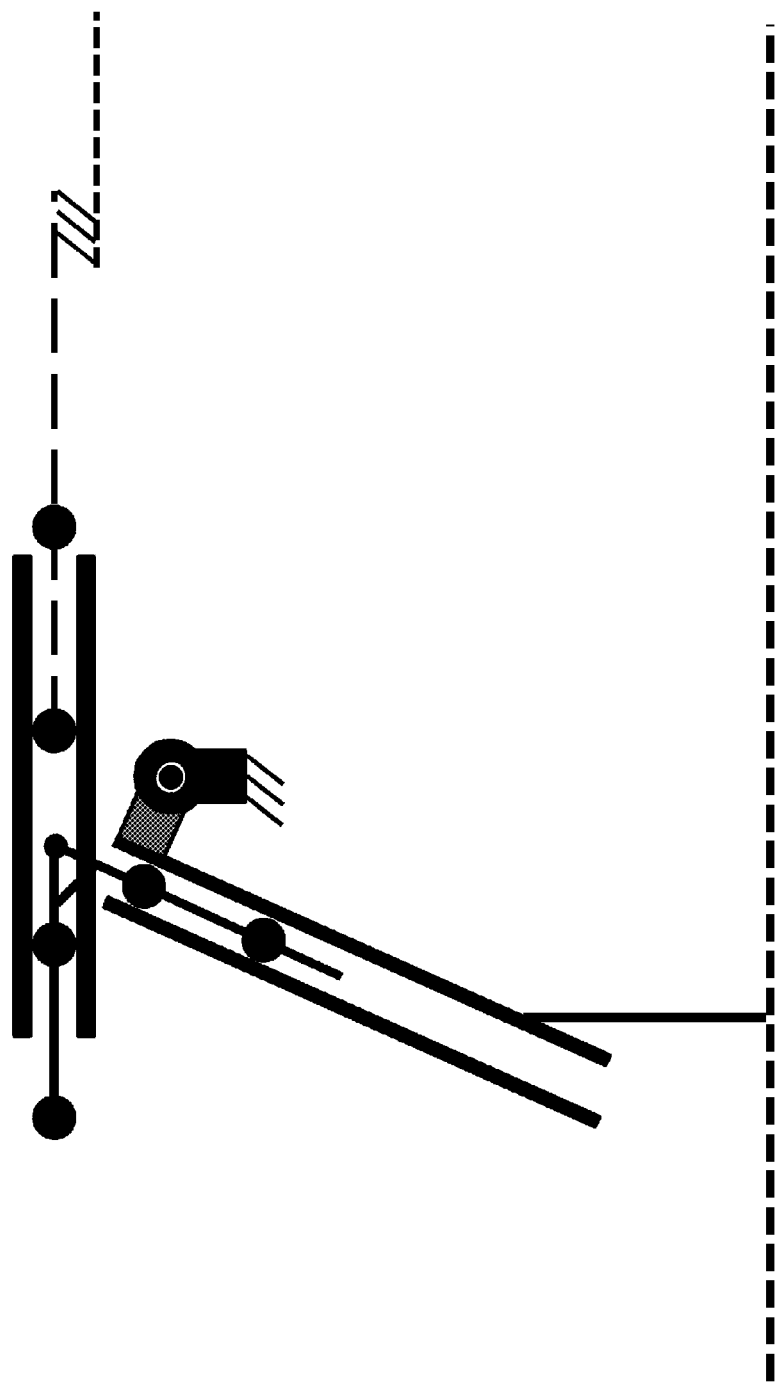
Figure 3:
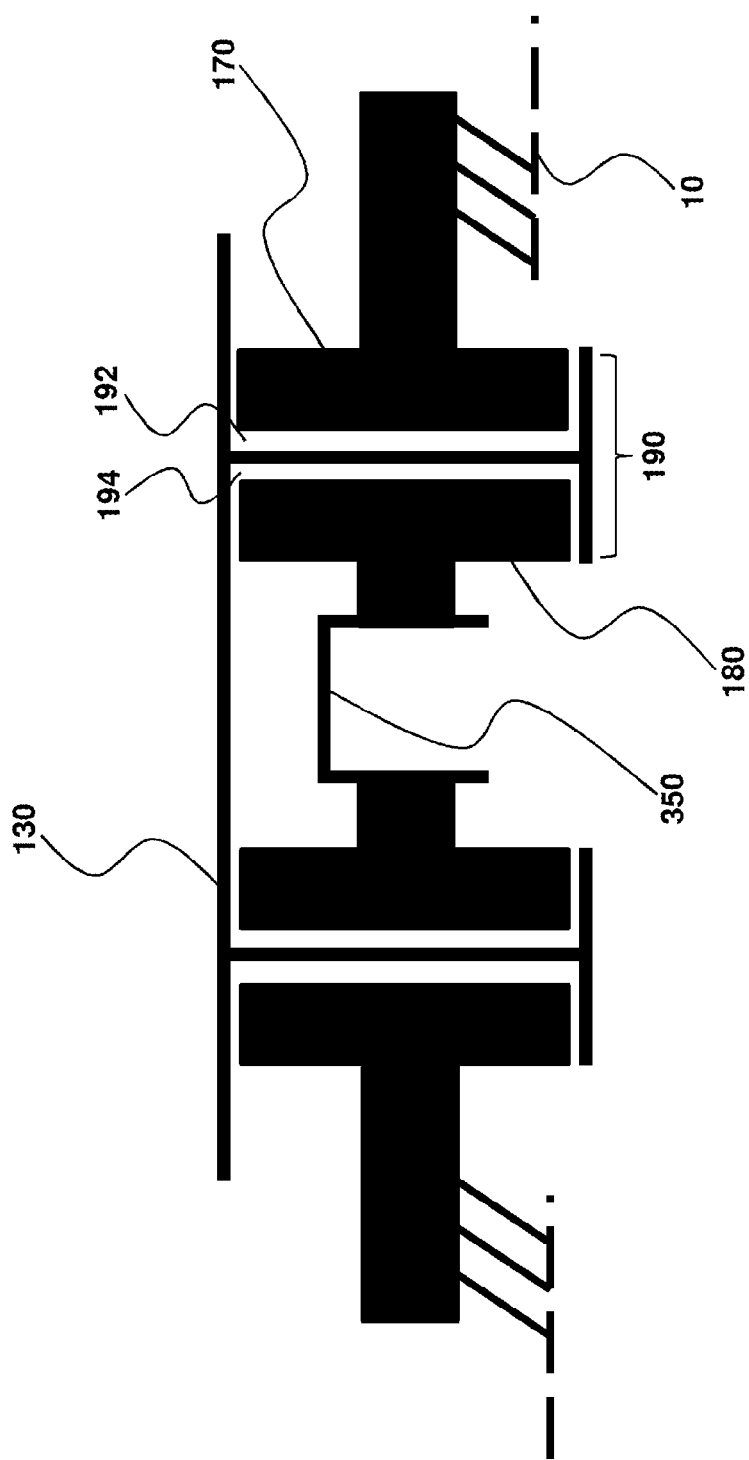
FIG. 3. Nested roller arrangement and two faced track on cargo slide platform.

Translational connections via rollers are illustrated in FIGS. 2-3. A plurality of roof beam rollers 170 are connected to the roof beam 10. A plurality of foldable cargo slide support rollers 180 are connected to the foldable cargo slide support. A two-faced track 190 is connected to the cargo slide platform 130. The two-faced track 190 has a first track 192 and a second track 194 that receive rollers 170 and 180, respectively. This facilitates cargo slide platform 130 linear motion in a horizontal direction 200 toward/away from vehicle center-line 22 and direction 202 along foldable cargo slide 60.

Figure 6:
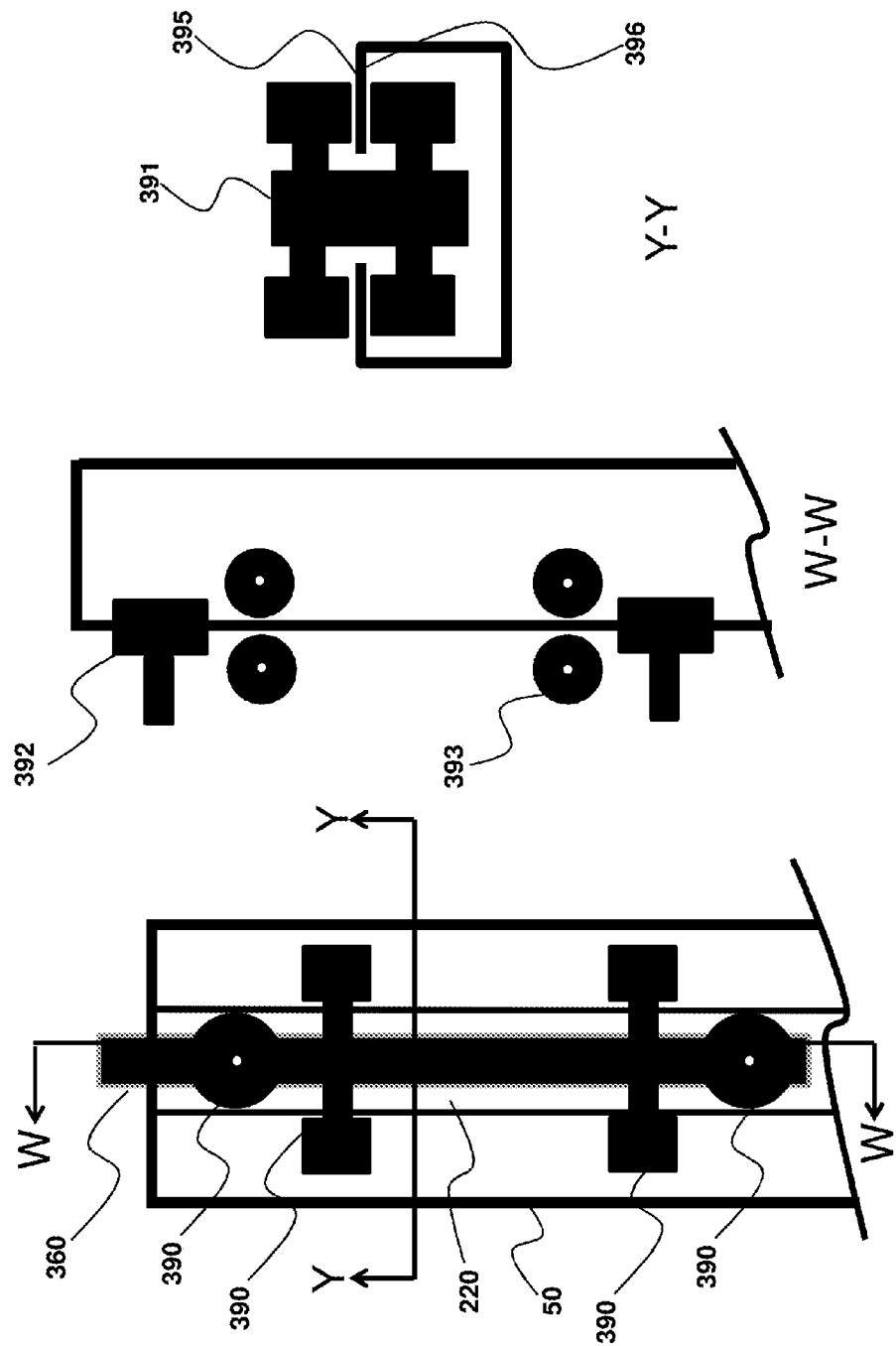
FIG. 6. Powered lift slide arrangement.

Translation connection between foldable cargo slide support 60 and longitudinal lift member 50 may be by a plurality of second foldable cargo slide support rollers 390 and a longitudinal track 220 connected to longitudinal lift member 50 (FIG. 6).

A lift assembly surface 230 may slide over at least a portion of a roof beam surface 240 (FIG. 4) and aligned along a longitudinal axis, such as indicated by dashed line labeled 10 in FIG. 2A (corresponding to roof beam).

As illustrated in FIG. 1A (top panel), the device may be provided for cargo loading from a left side 23, right side 24, or rear side 25 of the vehicle, by appropriately orienting the roof beam 10. Furthermore, a plurality of cargo slide platforms may be used to provide left and right side loading/unloading in a single roof beam. In this aspect, the total lengths 11 of the cargo slide platforms 130 (FIG. 7) is less than the length of the roof beam, so that the plurality of cargo slide platforms are stored in the roof beam interior volume.

As illustrated in FIG. 2C, the cargo slide platform has a horizontal range of motion 92 defined by translation along the roof beam 10 and foldable cargo slide support 60.

Mount 260 may connect the roof beam 10 directly to a vehicle roof rack or to a commercially available vehicle roof rack 270, and locks 262 that secure cargo to commercially available vehicle roof rack cross bars.

Referring further to FIG. 4, roof beam interior volume 280 has a cross-sectional shape 290, such as a generally U-shape, that receives cargo slide platform 130 including top surface 300, that may function to close interior volume 280 when in a stored position. When top surface 300 is removed from the roof beam 10, roof beam has an open upper facing surface 340.

To further reduce loads and increase stability, ground support legs 310 are connected to a lower end 320 of the longitudinal lift member 50. Electric drive 330 provides translation to the foldable cargo slide support 60. Referring to FIG. 2A, the foldable cargo slide support platform may comprise a cargo slide support beam 350, a powered lift slide 360, and an adjustable length strut 370. Additional support and moment control may be provided by a plurality of lift slide rollers 390 that track along longitudinal lift member 50 (FIG. 6).

A general schematic of the device relative to the vehicle illustrated is provided in FIG. 1 and relative movements provided in FIG. 2. In FIG. 2A the cargo slide platform 130 is supported rollers 170 connected to roof beam 10. Lift assembly 40, comprising longitudinal lift member 50, foldable cargo slide support 60, and ground support leg 310, are in a deployed configuration. The foldable cargo slide support is at a transfer height 160 and aligned with the roof beam 10, ready to receive cargo slide platform 130. Foldable cargo slide support 60 further comprises cargo slide support beam 350, powered lift slide 360, and adjustable length strut 370.

FIG. 2B shows the cargo slide platform in transition between the roof beam and foldable cargo slide support. The roller and track alignment of the two-face track facilitates a simple linear motion of the platform 130 (and any associated cargo thereon).

FIG. 2C shows the cargo slide platform that has completed its linear motion and transitioned from roof beam 10 to cargo slide support beam 350, and is ready for translation down the longitudinal lift member 50. In this position the cargo is fully supported on the lift assembly 40. Cargo load is shared between the pivot point, item 380, and the ground supports 310, with the bulk of the load on the ground supports.

FIG. 2D shows the cargo slide platform (along with the other elements of the foldable cargo slide support 60 in position for cargo loading and unloading. The powered lift slide 360 moves to this position using a linear drive mechanism (with an electric motor 330 illustrated in FIG. 1A), with the slide moving on rollers 390 for low friction. In this position the cargo load is more directly supported over the ground supports than in its upper position so a larger fraction of the load is transmitted to the ground. This ensures tolerance of operator cargo handling events such as inadvertent cargo dropping, minimizing loads transmitted to the vehicle.

Through all motions the cargo remains horizontal to the ground.

FIG. 3 illustrates the roller and track arrangement that establishes the linear motion of the cargo between the item roof beam 10 and foldable cargo slide support (or support beam) 350. The roof beam includes a plurality of roof beam rollers 170. The foldable cargo slide support also includes a plurality of foldable cargo slide support rollers 180. The cargo slide support platform 130, includes two roller track features, items 190 having one track 194 that faces in toward the center to align with the rollers 180 and one track 192 that faces out from the center to align with the rollers 170. This arrangement enables the cargo slide support platform to roll linearly from a position where it is supported on roof beam 10 to a position where it is supported on foldable cargo slide 60 (e.g., cargo slide support beam 350). The rollers 170 may be the same size as, or larger, or smaller than the rollers 180, with the first and second tracks correspondingly sized. The number of rollers and their linear spacing is selected so that a minimum of at least two rollers on each side are supporting the cargo at all times including during transition from roof beam 10 to foldable cargo slide 350.

Now referring to FIG. 4, which shows the arrangement that enables the lift assembly 40 to fold and store fully within the roof beam 10 internal volume 120 with the cargo 30 in place on the top surface 300 of the cargo slide platform 130. The roof beam is configured in a generally U-shaped arrangement that creates an internal space for the lift assembly. The rollers 170 are mounted to the two vertical sides of the U where they align with the tracks 192, supporting the cargo on the cargo slide platform. The cargo support beam 350 is also configured in a generally U-shaped arrangement with its dimensions and internal volume 352 selected so the internal volume 120 of roof beam 10 will fit over all elements of the item lift assembly including the powered lift slide 360 and item adjustable length strut 370. Internal volume 352 is configured to fit over and contain the lift assembly in a stored position. This enables the cargo support beam to fold down so the centerline through the rollers is parallel to the long axis of the longitudinal lift member 50. The adjustable length strut 370 is folded out from under cargo slide support beam 350 to the position shown.

With the elements stored, the rollers can align with their mating tracks on cargo slide support platform, thus allowing the entire lift assembly to fit into the roof beam with the cargo in place on the roof beam. This arrangement minimizes the height of the roof beam necessary to store the lift assembly by providing rollers 180 that pass through their mating tracks 194 during the stow or storage operation.

FIGS. 5A-5C and 6 show certain features that assist in ensuring that only one powered roof rack is required to accommodate cargo load offset from the device center.

While the desired loading configuration is with the cargo center of gravity aligned with the center of the powered roof rack, various circumstances can arise where the load is not aligned such as load shift during use or load length. Another desired loading consideration is that of minimal dynamic loads. Again, various circumstances may arise where substantial dynamic loads can be encountered such as the operator dropping the cargo from some height while loading. For such off center and dynamic loading scenarios the loads imparted to the vehicle must stay within acceptable bounds. The subject invention accomplishes this as follows:

FIG. 5A shows the front and FIG. 5B the side views for the loading/unloading offset load scenario. In the front view the cargo load, FC, is offset left of the center of the powered roof rack. In the side view it is offset left of the pivot 380. These offsets have the effect of generating moments that must be reacted.

In the front view, the cargo load FC causes the unit to rotate about point P, the left ground support legs' contact point with the ground. The pivot point, item 380, includes features such that the vertical load, FV, is near zero; so, the moment in the front plane caused by FC is reacted at the pivot point primarily by the lateral load, FL. In this view the effect of angle M is to move the location of point P to a distance J that is closer to the line of action of FC, thus reducing the moment reacted by FL. It can also be seen that dimension H is much larger than dimension J so the load FL is further minimized.

In the side view the cargo load FC generates a moment about P that is reacted at the pivot 380 primarily by perpendicular load FP. Here, the geometry of the roof rack again establishes the location of point P near the line of action of FC so dimension H is much larger than dimension K. This geometry minimizes FP. In this view angle N is shown to be less than 90 degrees in order to ensure the assembly is stable and does not rotate underneath the pivot point towards the vehicle side.

FIG. 5A also illustrates a feature of the ground support legs 310 in that their length is independently adjustable so they can accommodate uneven ground.

Figure 5C:
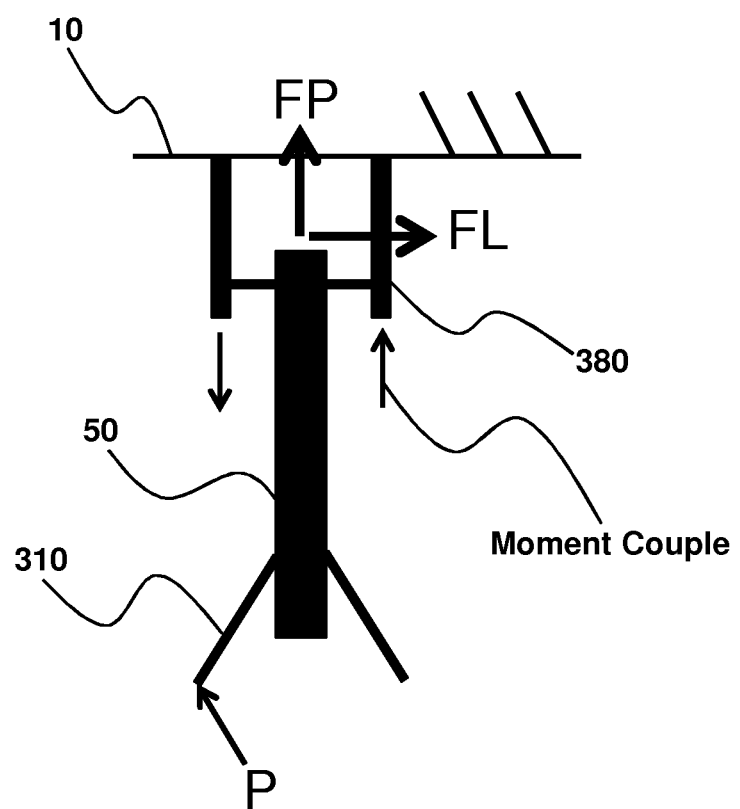
FIG. 5C shows offset loads configuration for the top view.

FIG. 5C shows the top view for the offset load scenario where it can be seen that the reaction loads FP and FL produce moments in the top plane about point P. The pivot point consists of two supports, one on either side of the longitudinal lift member 50 capable of reacting loads in the top plane. This arrangement enables a moment couple to be developed to react out the moment about point P from the reaction loads in the top plane.

Now referring to FIG. 6 to show the features of the longitudinal lift member 50 and the powered lift slide 360 that enable moments to be carried across the interface and still allow low friction motion of the powered lift slide along the long axis the longitudinal lift member 50.

The longitudinal lift member 50 has a square or rectangular cross section with a slot or track cut along the long axis through the center of the top flange. The item powered lift slide 360 includes a plurality of lift slide rollers 390, specifically ten rollers, 391 392 and 393 arranged to transfer moments in all planes from the powered lift slide 360 to the longitudinal lift member 50.

There are two rollers 392 which are positioned within the longitudinal slot in the longitudinal lift member 50 top flange. The axis of rotation of these rollers is perpendicular to the face of the longitudinal lift member 50 top flange. These two rollers transmit moments that lie in a plane parallel to the top surface of the longitudinal lift member 50. The moment couple reaction loads are transferred to the sides of the slot.

There are eight 393 rollers arranged in four sets of two. Each set of two rollers has one roller on each side of the longitudinal slot in the longitudinal lift member 50. Two sets of two ride on the outer surface 395 of the top flange and two sets of two ride on the inner surface 396 of the top flange. Moments in the plane of section W-W are carried by diagonally opposite sets of two rollers with reaction loads on the inner and outer surfaces of the top flange. Moments in the plane of section Y-Y are carried similarly.

It will be evident to those skilled in the art that this roller arrangement is able to carry all bending moments from an offset load FC into the longitudinal lift member 50 while still allowing low friction motion of the powered slide assembly along the long axis of the main beam.

Statements Regarding Incorporation by Reference and Variations

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

Every formulation or combination of components described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that materials, connections, and geometrical configurations other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

I claim:

1. A device for supporting cargo on a vehicle roof comprising:
   a roof beam configured to connect to a vehicle roof and to support cargo on top of the vehicle roof;
   a lift assembly translationally and rotably connected to said roof beam, said lift assembly comprising:
      a longitudinal lift member;
      a foldable cargo slide support translationally connected to said longitudinal lift member;
      said lift assembly having a deployed configuration and a stored configuration, wherein in a deployed configuration:
         said longitudinal lift member laterally extends from said roof beam and has a rotation angle relative to said roof beam to provide a deployed direction that extends in a direction from the vehicle roof toward ground level;
         said foldable cargo slide support extends from said longitudinal lift member and is aligned with said roof beam;
      wherein in a stored configuration said lift assembly is stored within an interior volume of said roof beam;
   a cargo slide platform translationally connected to said roof beam and to said foldable cargo slide support,
      said cargo slide platform translational connection with each of said roof beam and said foldable cargo slide support is releasable for translation of said cargo slide platform along said roof beam or said foldable cargo slide support;
      said cargo slide platform and said foldable cargo slide support in combination translate along said longitudinal lift member from a minimum height for cargo loading or unloading to a transfer height that aligns said cargo slide platform with said roof beam, and
      said cargo slide platform is continuously horizontally aligned during translation along said longitudinal lift member and translation along said roof beam.

2. The device of claim 1, wherein said cargo slide platform translational connections comprise:
   a plurality of roof beam rollers connected to said roof beam;
   a plurality of foldable cargo slide support rollers connected to said foldable cargo slide support;
   a two-faced track connected to said cargo slide platform having a first track and a second track to receive:
      said roof beam rollers in said first track for translation of said cargo slide platform relative to said roof beam to provide motion in a horizontal direction toward or away from a vehicle center-line; and
      said foldable cargo slide support rollers in said second track for translation of said cargo slide platform relative to said foldable cargo slide support to provide motion in a horizontal direction toward or away from said roof beam.

3. The device of claim 1, wherein said translational connection between said foldable cargo slide support and said longitudinal lift member comprises:
   a plurality of second foldable cargo slide support rollers connected to said foldable cargo slide support; and
   a longitudinal track connected to said longitudinal lift member for operably receiving said plurality of second foldable cargo slide support rollers.

4. The device of claim 1, wherein at least a portion of a lift assembly surface is configured to slide over at least a portion of a roof beam surface in a direction aligned with a longitudinal axis of said roof beam under a user-applied force.

5. The device of claim 1, configured for:
   cargo loading from a left, right, or rear side of a vehicle; or
   use with a plurality of cargo slide platforms for cargo loading from a left and a right side of a vehicle with a single roof beam.

6. The device of claim 1, wherein:
   said minimum height for cargo loading or unloading is greater than or equal to two feet and less than or equal to 6 feet;
   said transfer height is greater than said minimum height and corresponds to a vertical height from the ground of said roof beam on a vehicle roof; and
   said cargo slide platform has a horizontal range of motion selected to avoid physical contact between any of said lift assembly or cargo slide platform with a vehicle surface.

7. The device of claim 1, wherein said longitudinal lift member deployed direction has an angle relative to a ground surface that is greater than 45° and less than or equal to vertical (90°) and said deployed longitudinal lift member does not contact a vehicle surface.

8. The device of claim 1, further comprising a mount connected to said roof beam for connecting said roof beam to a vehicle roof rack.

9. The device of claim 1, wherein said roof beam has an interior volume and cross-sectional shape for receiving said lift assembly and said cargo slide platform during device storage, said cargo slide platform having a top surface to define an interior volume top surface during device storage.

10. The device of claim 1, wherein said lift assembly further comprises:
    one or more ground support legs operably connected to a lower end of said longitudinal lift member;
    wherein for said longitudinal lift member deployed configuration said one or more ground support legs contact a ground surface at an angle to stably support said longitudinal lift member during cargo loading or unloading.

11. The device of claim 10, wherein said one or more ground support legs have an independently adjustable length.

12. The device of claim 1, further comprising an electric drive connected to said lift assembly to translationally move said foldable cargo slide support along said longitudinal lift member.

13. The device of claim 12, wherein said electric drive is positioned within an interior volume of said longitudinal lift beam during device storage.

14. The device of claim 1, wherein said roof beam has a substantially U-shaped cross-section with an open upper facing surface that defines an internal volume and said cargo slide platform has a top surface for supporting cargo; wherein in a device stored position:

said cargo slide platform top surface extends across said roof beam open upper facing surface to define a roof beam closed volume in which said lift assembly is positioned.

15. The device of claim 14, further comprising one or more ground support legs rotably connected to said longitudinal lift member and configured to rotate to a stored position substantially parallel with a longitudinal axis of said longitudinal lift member for storage within said roof beam closed volume.

16. The device of claim 14, further comprising:
a plurality of roof beam rollers connected to said roof beam;
a plurality of foldable cargo slide support rollers connected to said foldable cargo slide support;
a two-faced track connected to said cargo slide platform having a first track and second track to receive:
said roof beam rollers in said first track for translation of said cargo slide platform relative to said roof beam to provide motion in a horizontal direction toward or away from a vehicle centerline;
said foldable cargo slide support rollers in said second track for translation of said cargo slide platform relative to said foldable cargo slide support to provide motion in a horizontal direction toward or away from said roof beam;
wherein in said device-stored position:
said two-faced track is positioned within said roof beam internal volume and supported on said plurality of roof beam rollers positioned in said first track;
said lift assembly positioned fully in said roof beam internal volume with said foldable cargo slide support folded into a stored position to position said plurality of foldable cargo slide rollers in alignment with said second track for translation of said lift assembly along said roof beam and said cargo slide platform and into said roof beam internal volume.

17. The device of claim 1, wherein said foldable cargo slide support comprises:
a cargo slide support beam for translationally receiving said cargo slide support platform;
a powered lift slide that translationally moves along said longitudinal lift member and is connected to said cargo slide support beam;
an electric drive operably connected to said powered lift slide that provides power to translate said powered lift slide relative to said longitudinal lift member;
an adjustable length strut connected to said cargo slide support beam to establish and maintain said horizontal alignment of said cargo slide support platform during translational motion along said longitudinal lift member.

18. The device of claim 17, further comprising a plurality of lift slide rollers connected to said powered lift slide that transmit moments in three orthogonal axes during translational motion along said longitudinal lift member.

19. The device of claim 1, further comprising a cargo frame connected to a top surface of said cargo slide platform, wherein said cargo frame support is customized to support one or more of a bicycle, a kayak, a canoe, a container, a ski, a snowboard, or a ladder.

20. A method for storing cargo on a vehicle roof comprising the steps of:
removing a lift assembly comprising a longitudinal lift member from an interior volume of a roof beam that is connected to said vehicle roof;
pivoting said removed lift assembly relative to said roof beam to extend said longitudinal lift member in a direction away from said vehicle roof and toward a ground surface;
deploying one or more ground support legs connected to an end of said longitudinal lift member to support said removed lift assembly against the ground surface;
aligning a foldable cargo slide support connected to said longitudinal lift member with said roof beam at a transfer height;
removing a cargo slide platform from said roof beam by translating said cargo slide platform along said roof beam and translating along said foldable cargo slide support;
translating said cargo slide platform and said foldable cargo slide support along said longitudinal lift member to a cargo loading height that is less than said transfer height;
securing cargo to said cargo slide platform at said cargo loading height;
translating said cargo slide platform and said foldable cargo slide support along said longitudinal lift member to said transfer height, thereby aligning said cargo slide platform and cargo with said roof beam;
moving said cargo slide platform and cargo from said foldable cargo slide support to said roof beam by translating said cargo slide platform along said foldable cargo slide support and said roof beam;
securing said cargo on said cargo slide platform to said vehicle roof; and
storing said one or more ground support legs, said lift assembly, and said foldable cargo slide support within said roof beam interior volume;
wherein during translation of said cargo slide platform, said cargo slide platform is continuously maintained in a substantially horizontal configuration.

* * * * *